3,268,602
PROCESS FOR THE DEHYDROHALOGENATION OF HALOGENATED HYDROCARBONS

Anthony George Goble and John Francis Charles Nicholls, Sunbury-on-Thames, England, assignors to The British Petroleum Company Limited, London, England, a British joint-stock corporation
No Drawing. Filed Feb. 26, 1963, Ser. No. 261,225
Claims priority, application Great Britain, Mar. 2, 1962, 8,168/62
6 Claims. (Cl. 260—654)

This invention relates to the dehydrohalogenation of halogenated hydrocarbons.

The term "dehydrohalogenation" is used herein with reference to a process in which hydrogen and halogen is removed from a halogenated hydrocarbon; in accordance with the process described either all or a part of the halogen content of the halogenated hydrocarbon may be removed.

According to the present invention a halogenated hydrocarbon is passed over a halogenated catalyst obtained by contacting a halogenatable inorganic oxide with a compound containing the group

where Ha and Ha' are halogen atoms, being the same or different and a dehydrohalogenated product is recovered.

Preferably the halogenatable inorganic oxide is a refractory oxide selected from Groups III to V of the Periodic Table, for example alumina, boria, silica, titania, or zirconia. The preferred refractory oxide is alumina. Mixtures of two or more inorganic oxides may be used if desired.

When alumina is used in the formation of the catalyst this alumina will preferably contain some hydrogen. This is a characteristic of activated aluminas which although predominantly alumina do contain a small amount of hydrogen, usually less than 1% wt. This hydrogen is generally considered to be in the form of surface hydroxyl groups, and it is believed that the halogen compound introduces halogen into the alumina at the position of at least some of the original surface acid hydroxyl sites to form the active catalyst sites.

Any of the forms of alumina suitable as a base for reforming catalysts may be used, but a particularly preferred form is one derived from an alumina hydrate precursor in which the trihydrate predominates. One containing a major proportion of β-alumina trihydrate is particularly suitable. A convenient method of preparing the alumina is by hydrolysis of an aluminum alcoholate, for example aluminum isopropoxide, in an inert hydrocarbon solvent, for example, benzene. Other things being equal, the greater the amount of halogen taken up by the alumina, the greater is the activity of the catalyst and since, as stated above, the maximum amount of halogen which can be added is related to the surface area, it is desirable that the alumina should have a high surface area, for example more than 250 m.$^2$/g. and preferably more than 300 m.$^2$/g.

Suitably the halogenatable inorganic oxide, before halogenation, is treated with an alkali metal compound or alkaline earth metal compound under conditions such that alkali metal or alkaline earth metal is retained by the oxide.

Preferably the alkali metal compound or alkaline earth metal compound which is used in the formation of the catalyst is an ionic compound. Preferably this compound is a compound which is capable of providing metal cations under the conditions under which it is brought into contact with the inorganic oxide or under conditions employed subsequently but prior to halogenation of the catalyst.

The precise way in which the addition of an alkali metal or alkaline earth metal acts to alter the activity of the catalyst is not known for certain but it is believed that the metal cation combines in some way with the inorganic oxide, possibly at acid hydroxyl sites present on the surface of the oxide. Preferably therefore the oxide is treated after the contacting to dissociate the alkali metal compound or alkaline earth metal compound, for example by calcination, and the compound used is preferably one which can be dissociated without leaving other elements on the oxide. Particularly suitable compounds are salts of organic acids, particularly carboxylic acids, for example formates, acetates and oxalates. The alkali metal compound or alkaline earth metal compound may conveniently be added to the inorganic oxide by impregnation using a solution of the compound. The amount of alkali metal or alkaline earth metal retained may be small in relation to the amount of inorganic oxide, for example in the range 0.01–10% wt. by weight of inorganic oxide. The minimum amount necessary in any given application to render the catalyst selection may be determined by experiment. Metal present in excess of this minimum amount is not deleterious and it has been found that appreciable amounts of halogen can be taken up by oxides containing for example 4% by wt. or higher of alkali metal.

Preferably the catalyst is obtained by contacting the treated inorganic oxide, at elevated temperature, with the vapour of a compound of general formula

(where X and Y may be the same or different and selected from H, Cl, Br or SCl, or where X and Y together may be O or S). However, if desired other halogen containing agents may be used.

Preferably the compound employed is one in which the group CCl$_2$ is not directly attached to a carbon atom.

The subsequent chlorination is essentially the same as that disclosed in the complete specification of copending U.S. patent application S.N. 135,426, filed September 1, 1961; the catalyst containing from 2.0×10$^{-4}$ to 3.5×10$^{-4}$ g. chlorine/sq. meter of surface area. Suitable compounds having the required structural formula are:

Carbon tetrachloride (CCl$_4$)
Chloroform (CHCl$_3$)
Methylene chloride (CH$_2$Cl$_2$)
Trichlorobromomethane (CCl$_3$Br)
Thiocarbonyltetrachloride (CCl$_3$SCl)
Phosgene (COCl$_2$)
Thiophosgene The first three compounds listed are preferred. In the case of compounds containing elements other than chlorine, carbon and hydrogen, the treatment may add the other elements to the catalyst in addition to the chlorine. The presence of these other elements does not effect the activity conferred by the chlorine, but it may confer other properties and care should, therefore, be exercised to ensure that the selectivity of the catalyst is not affected. Small amounts of halogen (including chlorine) may also be present in the catalyst prior to the chlorination treatment without affecting the activity conferred by the chlorination. Thus the inorganic oxide subjected to the process of the present invention may be a platinum-alumina catalyst containing up to 1% wt. of halogen such as is normally used for the reforming of gasoline boiling range hydrocarbons.

Preferably the temperature, time of contact and amount of halogen-containing compound used in the formation of the catalyst are such that the up-take of halogen is at least 1% and not greater than 15% by weight. Since the halogenation is essentially a surface phenomonen the amount of halogen which can be added without the formation of free halogen is related to the surface area of the catalyst, the greater the surface area, the greater is the amount of halogen which can be added without the formation of free halogen; this is usually at least half the amount which could have been added without the formation of free halogen if the catalyst had not been treated with an alkali metal or alkaline earth metal.

It has been found that in the case of some catalysts reducing conditions tend to convert the halogen compound to hydrogen halide, which gives an inactive catalyst. Preferably, therefore, non-reducing conditions are used for the halogenation; these conditions may be either inert or oxidising conditions, the latter being preferred. A convenient method of contacting the metal oxide is to pass a gaseous stream of the halogen compound over the metal oxide either alone or, preferably, in a non-reducing carrier gas. Examples of suitable carrier gases are nitrogen, air or oxygen.

The temperature for the halogenation may be from 300–1100° F. (149–593° C.). The tendency when using alumina to form free aluminium halide increases with temperature and care should, therefore, be exercised when using the higher temperatures within the stated range. Since the temperatures used will normally be above the volatilisation temperature of aluminium halide the formation of free aluminium halide is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° C. (149–317° C.), platinum-on-alumina composites being more particularly treated at 450–600° F. (232–316° C.) and palladium-on-alumina composites at 500–650° F. (260–343° C.). The chlorination reaction is exothermic and the temperatures specified are the initial temperatures used.

The rate of addition of the halogen compound is preferably as low as practicable to ensure uniform halogenation and to avoid a rapid increase of temperature as a result of the exothermic reaction. Preferably the addition rate does not exceed 1.3% wt. of halogen compound by weight of catalyst per minute. If a carrier is used, the rate of flow is preferably at least 200 volumes/volume catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water. Suitable conditions for forming the catalyst are described in copending U.S. patent applications S.N. 135,426, filed September 1, 1961, and S.N. 239,048, filed November 20, 1962.

Preferably the process of this invention is carried out at elevated temperature. Preferably the temperature is greater than 100° C.

Pressure may be sub-atmospheric, atmospheric or super-atmospheric.

Preferably the feedstock is passed over the catalyst in vapour phase. Reaction temperatures will suitably lie in the range 100°–300° C. Preferably there is employed an inert carrier gas, for example, nitrogen.

The feedstock may be an open chain compound or a ring compound. Preferably the compound is fully saturated, most preferably the compound is a halogenated normal paraffin having a carbon number in the range 4–20.

Typical reactions which may be carried out according to the invention are the conversion of 1,2-chloro-ethane to vinyl chloride and the conversion of mono-chlorocyclohexane to cyclohexane.

The invention is illustrated but not limited with reference to the following examples.

*Example 1*

A chlorinated alumina catalyst (12.0 percent weight chlorine) was prepared by contacting an alumina catalyst maintained at 300° C. with a stream of dry nitrogen saturated at room temperature with carbon tetrachloride.

1.4 ml of this catalyst was then introduced into a small vertical reactor and 1,2-dichloroethane (in nitrogen) was passed downflow at atmospheric pressure and a liquid hourly space velocity of 0.2 wt./wt./hour.

The conversion data obtained during the period 24–30 HOS are given below.

| Temperature, ° C. | 163 | 173 | 183 | 193 |
|---|---|---|---|---|
| Conversion to Vinyl Chloride, Percent wt. | 55 | 62 | 68 | 75 |

*Example 2*

A chlorinated alumina catalyst (12.0 percent weight chlorine) was prepared as in Example 1.

26 ml. of this catalyst in the form of ⅛ inch pellets was then charged into a small vertical reactor and a feedstock consisting of a mixture of halogenated normal paraffins containing between 9 and 14 carbon atoms per molecule was passed through the reactor at atmospheric pressure and a liquid hourly space velocity of 0.77 v./v./hr. in the presence of a nitrogen diluent flowing at a rate of 150 ml./hr.

The initial chlorine content of the feedstock was 3.98% by weight, corresponding to a content of 19 mole percent of mono-chlorohydrocarbons.

The feedstock was passed over the catalyst at different temperatures and the following results were obtained.

| Temperature, ° C. | Wt. Percent Cl in product | Percent dehydrochlorination [1] | Olefin Yield, Wt. Percent of dehydrochlorinated product |
|---|---|---|---|
| 100 | 2.07 | 48 | 20 |
| 150 | 0.52 | 87 | 16 |
| 200 | 0.43 | 89 | 22 |
| 250 | 0.06 | 99 | 51 |

[1] Expressed as $\dfrac{\text{wt. percent Cl in feed} - \text{wt. percent Cl in product}}{\text{Wt. percent Cl in feed}} \times 100$

We claim:

1. A dehydrochlorination process which comprises passing a chlorinated paraffin having a carbon number in the range 2–20 in vapor phase at a temperature in the range 100°–300° C. over a catalyst obtained by contacting a halogenatable inorganic oxide selected from refractory oxides of elements of Groups III, IV and V of the Periodic Table according to Mendeléeff with an organic chlorine containing compound having the general formula:

where X and Y when monovalent, are selected from the group consisting of H, Cl, Br and SCl, and X and Y, when together are divalent, are selected from the group consisting of O and S, said organic chlorine containing compound being contacted with said halogenatable inorganic oxide under non-reducing conditions and at a temperature in the range 149°–593° C. such that chlorine is taken up by said oxide without the production of free chloride, said catalyst containing from $2.0 \times 10^{-4}$ to $3.5 \times 10^{-4}$ g. of chlorine/sq. meter of surface area.

2. A process according to claim 1 wherein the refractory oxide is alumina.

3. A process according to claim 1 wherein the halogenatable inorganic oxide bears a compound selected from alkali metal compounds and alkaline earth metal compounds.

4. A process according to claim 3 wherein said compound is present in an amount between 0.01 and 10% by weight of the inorganic oxide.

5. A process according to claim 1 where the compound of general formula

is selected from the group consisting of carbon tetrachloride, chloroform and methylene chloride.

6. A process according to claim 1 wherein the halogenated hydrocarbon is saturated.

References Cited by the Examiner

UNITED STATES PATENTS

| | | | |
|---|---|---|---|
| 2,410,541 | 11/1946 | Joyce | 260—654 |
| 2,525,589 | 10/1950 | Cass | 260—654 |
| 2,642,384 | 6/1953 | Cox | 208—139 |
| 2,765,351 | 10/1956 | Conrad | 260—654 |
| 2,803,677 | 8/1957 | Neher et al. | 260—654 |
| 2,803,678 | 8/1957 | Conrad | 260—654 |

OTHER REFERENCES

Thomas: Anhydrous Aluminum Chloride, Reinhold (New York, 1941), pp. 857–861.

LEON ZITVER, *Primary Examiner.*

K. V. ROCKEY, *Assistant Examiner.*